United States Patent Office 3,697,456
Patented Oct. 10, 1972

3,697,456
FLAME-RETARDANT POLYURETHANE FOAM
James J. Pitts, Wallingford, and Peter H. Scott, Guilford, Conn., assignors to Olin Corporation, New Haven, Conn.
No Drawing. Filed Sept. 3, 1970, Ser. No. 69,430
Int. Cl. C08g 22/46, 54/56
U.S. Cl. 260—2.5 AJ         12 Claims

ABSTRACT OF THE DISCLOSURE

In a process for making flame-retardant polyurethane foam by incorporating in the foam forming formulation a halogenated organic compound and antimony oxide, an improvement is disclosed wherein part of the antimony oxide is replaced with another, less expensive metal oxide from the group consisting of ferric oxide, cupric oxide, titanium dioxide, and mixtures thereof.

---

This invention relates to flame-retardant polyurethane foam and to an improvement in a process for making such foam, which process calls for incorporating in the polyurethane foam forming formulation a halogenated organic material and antimony oxide. More specifically, the invention has to do with replacing part of the antimony oxide with another, more readily available metal oxide.

The wide range of utility of polyurethane foam has been somewhat circumscribed by its flammability. Consequently, numerous efforts have been made in recent years to develop ways of imparting flame-retardance to the foam. One of the well-known ways is to incorporate in the polyurethane foam forming formulation a halogenated organic material. In this particular art, antimony oxide, when employed as a co-additive with the halogenated organic material, has been found to act as a halogen synergist. Thus it has been recognized in the art that highly flame-retardant properties can be imparted to polyurethane foams by including in the foam forming formulation both a halogen-containing organic material and antimony oxide. For example, U.S. Pat. No. 3,164,558, which relates to self-extinguishing urethane polymer compositions, discloses that a synergistic effect takes place when a combination of an organic bromide and antimony oxide is used as a flame-retardant additive. U.S. Pat. No. 3,075,928 discloses the concept of imparting a high degree of flame-resistance to polyurethane foam by incorporating in the polyether reactant about 2 to 8% by weight of antimony trioxide and about 3 to 12% by weight of a vinyl halide resin.

However there are a number of objections to the use of antimony oxide. These include its relatively very high cost, its toxicity and high smoke level, and its tendency to cause after-glow on burning.

A primary object of this invention is to minimize the drawbacks of the prior art relating to the use of a halogenated organic compound and antimony oxide in making flame-retardant polyurethane foam. Another object is to reduce the amount of antimony oxide which is necessary as a co-additive in making flame-retardant foam. A further object is to provide a readily available partial replacement for the antimony oxide used in combination with a halogenated organic material as a flame-retardant co-additive for polyurethane foam. These and other objects of the invention will become apparent from the detailed description which follows.

The above objects can be accomplished, in accordance with this invention, by employing as a flame-retardant additive in polyurethane foam forming formulations a mixture of a halogenated organic material, antimony oxide and another metal oxide selected from the group consisting of ferric oxide, cupric oxide, titanium dioxide, and mixtures thereof.

In preparing flame-retardant polyurethane foam in accordance with the teachings of the invention, any halogen-generating organic material may be employed, including reactive and non-reactive materials. Furthermore, such halogen-containing materials may contain substituents other than halogen, such as phosphorus, nitrogen, and so forth.

Illustrative reactive halogen-containing materials are the halogenated active hydrogen-containing compounds which are known to react with organic isocyanates to produce urethane polymers. These include the halogenated aliphatic and aromatic polyols. Also included are the halogenated, polyhydroxy ethers. Such ethers may for example be the products obtained by reacting a halogenated alkylene oxide with a polyhydric alcohol initiator. A detailed description of these polyethers and their preparation is disclosed in U.S. Pat. No. 3,402,169, issued Sept. 17, 1968. The entire disclosure of this patent is incorporated by reference herein. Representative halogenated alkylene oxides, as used in accordance with U.S. Pat. No. 3,402,169, include the polyhalogenated lower epoxyalkanes such as 4,4,4-trichloro-1,2-epoxybutane, 4,4,4-tribromo-1,2-epoxybutane, the trihaloepoxypropanes, and so forth; and representative polyhydric alcohol initiators include the glycols, such as ethylene glycol and propylene glycol, the triols, such as glycerol and trimethylolpropane, and higher functionality polyhydroxy compounds such as pentaerythritol, sorbitol, and the carbohydrates, e.g. sucrose, dextrose, maltose, starch etc., and their derivatives.

Other reactive halogen-containing organic materials which may be used in accordance with the teachings of this invention are the halogenated organic isocyanates, which are known to react with active hydrogen-containing compounds, such as monobromotoluene diisocyanates and the like.

Representative non-reactive halogen-containing organic materials include the halogenated aliphatic, cycloaliphatic, cyclic, and aromatic hydrocarbons. Illustrative are tetrachlorobutane, tetrabromobutane, hexabromoethane, chlorendic anhydride, the tetrahalogenated phthalic anhydrides, tetrabromocyclooctane, tetrachlorocyclooctane, hexachlorocyclopentadiene, hexabromocyclododecane, hexachlorocyclododecane, hexabromocyclohexane, pentabromotoluene, the halogenated bi- and poly-phenyl aromatic compounds, and the like. Also included in the group of non-reactive halogen-containing organic materials are the halogenated polymeric materials such as the polyvinyl halides and the polyvinylidene halides.

In the preferred embodiment of the invention, the halogenated reactive-hydrogen-containing organic compounds, such as the halogenated polyhydroxy ethers, are employed. These, as noted above, may be prepared by reacting a halogenated alkylene oxide with a polyhydroxy alcohol initiator. They may be used as the sole reactive-hydrogen compounds in the preparation of the polyurethane foam, or in combination with other non-halogenated reactive-hydrogen-containing compounds.

The halogenated organic compounds are employed in a proportion sufficient to provide at least about 1% halogen in the polyurethane foam. Preferably, such a proportion is used as would result in a polyurethane foam containing from about 5 to about 20% by weight of halogen.

Any of the known antimony oxides may be used in accordance with this invention. These include antimony trioxide ($Sb_2O_3$), antimony tetraoxide ($Sb_2O_4$), and antimony pentoxide ($Sb_2O_5$). However, antimony trioxide or antimony tetraoxide is preferably used, with the trioxide being the most preferred.

The proportion of the antimony oxide used in practicing the invention is based on the total weight of polyol employed in preparing the polyurethane foam. Although, higher, as well as lower, proportions may be employed, usually between about 0.1 and about 20 parts, per about 100 parts by weight of total polyol, of antimony oxide are employed. A preferred range is between about 0.5 and about 15 parts, and in the most preferred embodiments of the invention from about 1 to about 11 parts of antimony oxide, per about 100 parts by weight of total polyol, are employed.

In accordance with the teachings of the invention, a metal oxide selected from the group consisting of ferric oxide ($Fe_2O_3$), cupric oxide (CuO), titanium dioxide ($TiO_2$), and mixtures thereof is employed to replace part of the antimony oxide flame retardant co-additive. These metal oxides are readily available and considerably less expensive than the antimony oxide. These metal oxides may be in any crystalline form or particle shape. For example, the alpha or the gamma crystalline ferric oxide may be employed, as well as ferric oxides having cubical acicular or spheroidal particle shape. Likewise, the titanium dioxide employed may be of the rutile or the anatase crystalline variety.

Although any of these oxides, or mixtures thereof, can be employed according to the invention, the preferred oxides are ferric oxide and cupric oxide.

The metal oxides of the invention are generally employed in a proportion ranging from about 0.05 to about 40 parts per 100 parts by weight of total polyol employed in preparing the polyurethane foam. Preferably a proportion of these oxides ranging from about 0.5 to about 30 parts, per 100 parts by weight of total polyol, is employed; and in the most preferred embodiment of the invention, a proportion ranging from about 1 to about 20 parts is employed.

The invention herein is applicable to flexible, semi-rigid, and rigid polyurethane foam compositions, the flexible polyurethane foams being preferred. In preparing the polyurethane foam, either the so-called "one-shot" method or the "semi-prepolymer" method may be employed. Any combinations of polyols, including polyester polyols and polyether polyols, organic polyisocyanates, foaming agent, catalysts, and other reactants capable of forming a cellular urethane material can be used, and the term "polyurethane foam forming formulation" in the specification and claims herein is meant to include any such combination. It is well-known in the art, for example, to prepare flexible polyurethane foam forming from formulations comprising at least one polyether polyol component having a hydroxyl number of less than about 250, an organic polyisocyanate, a foaming agent, and a catalyst. Typical formulations are disclosed in U.S. Pats. No. 3,072,582 issued Jan. 8, 1963, and No. 3,437,804, issued Oct. 17, 1967, in Canadian Pat. No. 705,938, issued Mar. 16, 1965.

The flame-retardant additive composition of the invention, comprising a halogenated organic materials, antimony oxide and one of the oxides named above or mixtures thereof, is added to the polyurethane foam forming formulation prior to foaming. Conveniently, it is first blended into the polyol component used in making the foam, and the blend is then added to the other components of the polyurethane foam forming formulation which is then allowed to expand into a cellular urethane body.

The flame-retardant properties of the resulting foam are generally at least comparable to the highly flame-retardant properties of foam in which none of the antimony oxide is replaced with the other metal oxides of the invention. This is based on a standard flame-retardance test according to ASTM D 1692–68. Two main determinations are made according to this test. The first determination is with respect to whether a foam sample is fire resistant, i.e., whether the foam sample is classified as "burning" or "self-extinguishing." If the sample is found to be self-extinguishing, a second determination is made with respect to its degree of flame-retardance. The degree of flame retardance is based on the extent that a standard sample is consumed by a flame before the flame is extinguished.

In addition to being readily available as partial replacements for the antimony oxide, the use of the metal oxides of the invention has added advantages. Thus inasmuch as such use reduces the amount of antimony oxide that is required, the smoke level of the resulting foam, when exposed to fire, is reduced. So is the tendency to cause after-glow. Furthermore, the metal oxides employed according to the invention are desirable partial replacements for the antimony oxide insofar as they are known to be less toxic than antimony oxide.

The following examples are provided to illustrate the invention. In these examples, all parts and percentages are by weight, unless otherwise specified.

EXAMPLE 1

A polyurethane foam forming formulation was prepared from the following ingredients in the indicated proportions:

| Ingredients: | Parts by weight |
|---|---|
| Oxypropylated glycerol (mol. wt. 3000) _gms__ | 75 |
| Oxytrichlorobutylated, oxypropylated ethylene glycol (76 hydroxyl number) _____gms__ | 25 |
| Ferric oxide ($Fe_2O_3$) _____gms__ | 5 |
| Antimony trioxide _____gms__ | 10 |
| Distilled water _____mls__ | 4 |
| Silicone surfactant [1] _____mls__ | 1.5 |
| Triethylene diamine catalyst _____mls__ | 0.6 |
| Stannous Octoate catalyst _____mls__ | 0.22 |
| Toluene diisocyanate (80% 2,4 and 20% 2,6 isomer mixture) _____mls__ | 42 |

[1] Dow Corning DC–190.

All the above ingredients, with the exception of the stannous octoate catalyst and the toluene diisocyanate, were first blended together. Then the stannous octoate was added. After stirring for about 15 seconds, the toluene diisocyanate was blended in, and the mixture was allowed to expand into a flexible foam having a density of about 1.40 grams per cubic centimeter and a chlorine content of 6.4% by weight.

The flame retardance of the foam was tested according to ASTM D–1692–68, using a sample 6 inches long, 2 inches wide and ½ inch thick. When a flame was applied to one end of this sample, it was found to be self-extinguishing, the burning rate being 2.8 inches per minute. The extent of the burn, by the time the flame became extinguished, was found to be 1.8 inches, thus proving that the foam had a high degree of flame retardance.

EXAMPLES 2–3

The identical procedure of Example 1 was followed except that in Example 2 the $Fe_2O_3$ was replaced with an equal proportion of CuO, and in Example 3 the $Fe_2O_3$ was replaced with an equal proportion of $TiO_2$. The results of the flame retardance test in the case of the foams prepared according to Examples 2 and 3 are provided in Table I below. As shown both foams had a high degree of flame retardance.

Comparative Test I

The identical procedure of Example 1 was followed again except that instead of 10 grams $Sb_2O_3$ and 5 grams $Fe_2O_3$, 15 grams of $Sb_2O_3$ were used. This was done to compare the flame retardance of the foam where only $Sb_2O_3$ is used instead of part of it being replaced with other oxides according to the invention. The results of the flame retardance test for this foam are recorded in Table I below.

Comparative Test II

The identical procedure of Comparative Test I was followed except that instead of 15 grams of $Sb_2O_3$, only 10 grams were used. This was done in order to demonstrate the reduction in degree of flame retardance of the foam when 10 grams of $Sb_2O_3$ are used as compared with 10 grams of $Sb_2O_3$ plus 5 grams of the metal oxides of the invention. The product foam was tested for flame retardance and the results are contained in Table I below.

TABLE I

| Foam sample | $Sb_2O_3$ (gms.) | Other oxide/gms. used | Rating[1] | Burning rate (ins./min.) | Extent of burn (ins.) |
|---|---|---|---|---|---|
| Example 1 | 10 | $Fe_2O_2/5$ | S.E. | 2.8 | 1.8 |
| Example 2 | 10 | CaO/5 | S.E. | 3.0 | 1.7 |
| Example 3 | 10 | $TiO_2/5$ | S.E. | 2.6 | 1.8 |
| C.T. I | 15 | None | S.E. | 2.7 | 1.8 |
| C.T. II | 10 | do | S.E. | 3.1 | 2.2 |

[1] Each foam sample is rated as burning (B) or self-extinguishing (S.E.) as the case may be.

As seen from the data in Table I, a combination of 5 grams of $Fe_2O_3$, CuO, or $TiO_2$ with 10 grams of $Sb_2O_3$ is more effective than 10 grams of $Sb_2O_3$ alone and at least practically as effective as 15 grams of $Sb_2O_3$.

Comparative Tests III–V

To test the effect of the oxides of the invention, when used in the absence of antimony oxide, Comparative Test I was repeated except that the 15 grams of $Sb_2O_3$ were replaced with 15 grams of $Fe_2O_3$ in Comparative Test III, with 15 grams of CuO in Comparative Test IV, and with 15 grams of $TiO_2$ in Comparative Test V. When the respective resulting foams were tested for flame retardance, each foam burned through. Thus surprisingly while the metal oxides used according to the invention are highly effective partial replacements for $Sb_2O_3$, they are not effective when used as total replacements.

EXAMPLES 4–9

The procedure of Example I was followed with the exception that different proportions or ratios of $Sb_2O_3$:$Fe_2O_3$ were used in these examples. The proportion of $Sb_2O_3$, $Fe_2O_3$ and the flame retardant properties of the respective foam for each of Examples 4–9 are recorded in Table II below.

TABLE II

| Foam sample | $Sb_2O_3$ (gms.) | $Fe_2O_3$ (gms.) | Ratio $Sb_2O_3$:$Fe_2O_3$ | Rating | Burning rate (ins./min.) | Extent of burn (ins.) |
|---|---|---|---|---|---|---|
| Example 4 | 10 | 3 | 10:3 | S.E. | 2.3 | 1.8 |
| Example 5 | 9 | 1 | 9:1 | S.E. | 2.9 | 1.6 |
| Example 6 | 8 | 2 | 4:1 | S.E. | 2.8 | 1.6 |
| Example 7 | 7 | 3 | 7:3 | S.E. | 2.7 | 1.6 |
| Example 8 | 7 | 1 | 7:1 | S.E. | 3.0 | 1.7 |
| Example 9 | 7.5 | 7.5 | 1:1 | S.E. | 2.9 | 1.9 |

The data in Table II above clearly demonstrates that widely varying ratios of $Sb_2O_3$ to $Fe_2O_3$ can be employed according to the invention in making highly flame-retardant polyurethane foam.

EXAMPLE 10

To further demonstrate the applicability of the invention to varying ratios of $Sb_2O_3$ to CuO, the procedure of Example 2 was followed here, except that instead of 5 grams of CuO, only 1 gram was used. The resulting foam was tested for flame retardance and found to be self-extinguishing, the extent of burn being 1.7 inches.

What is claimed is:

1. In a flame retardant polyurethane foam prepared from a polyurethane foam-forming formulation which comprises
    (a) a halogenated organic material in a proportion sufficient to provide at least 1% by weight of halogen in said polyurethane foam and
    (b) antimony oxide in such a proportion as is necessary to achieve flame retardant properties in said foam, which proportion ranges between about 0.1 and about 20 parts per 100 parts by weight of total polyol in said polyurethane foam-forming formulation, the improvement wherein up to about 50% by weight of the proportion of said antimony oxide is replaced with a metal oxide selected from the group consisting of ferric oxide, cupric oxide, titanium oxide and a mixture thereof.

2. The polyurethane foam of clami 1 wherein said polyurethane foam-forming formulation comprises a polyether polyol having an hydroxyl number of less than about 250.

3. The polyurethane foam of claim 1 wherein said metal oxide is ferric oxide or cupric oxide.

4. The polyurethane foam of claim 3 wherein the proportion of said halogenated organic material is sufficient to provide between abut 5% and about 20% by weight of halogen in said polyurethane foam.

5. The polyurethane foam of claim 4 wherein said antimony oxide is antimony trioxide or antimony tetraoxide.

6. The polyurethane foam of claim 5 wherein said foam-forming formulation comprises a polyether polyol having a hydroxyl number of less than about 250.

7. The polyurethane foam of claim 6 wherein the proportion of said antimony oxide ranges from about 0.5 to about 15 parts per 100 parts by weight of said polyether polyol.

8. The polyurethane foam of claim 7 wherein said halogenated organic material is a halogenated, polyhydroxy ether.

9. The polyurethane foam of claim 8 wherein said antimony oxide is antimony trioxide.

10. The polyurethane foam of claim 9 wherein said halogenated polyhydroxy ether is the product of reacting a halogenated epoxyalkane with a polyhydric alcohol initiator.

11. The polyurethane foam of claim 10 wherein said haolgenated epoxyalkane is 4,4,4-trichloro-1,2-epoxybutane.

12. The polyurethane foam of claim 11 wherein said halogenated polyhydroxy ether is oxytrichlorobutylated, oxypropylated ethylene glycol.

References Cited

UNITED STATES PATENTS

| 3,284,376 | 11/1966 | Pedjac et al. | 260—2.5 |
| 3,131,115 | 4/1964 | Robitschek et al. | 161—191 |
| 3,441,523 | 4/1969 | Dwyer et al. | 260—2.5 |
| 3,242,108 | 3/1966 | McGary et al. | 260—2.5 |
| 3,391,092 | 7/1968 | Worsley et al. | 260—2.5 |

FOREIGN PATENTS

| 1,159,435 | 7/1949 | Great Britain | 260—2.5 |

DONALD E. CZAJA, Primary Examiner

H. S. COCKER, Assistant Examiner

U.S. Cl. X.R.

260—2.5 AK, 45.75 R, DIG. 24